UNITED STATES PATENT OFFICE.

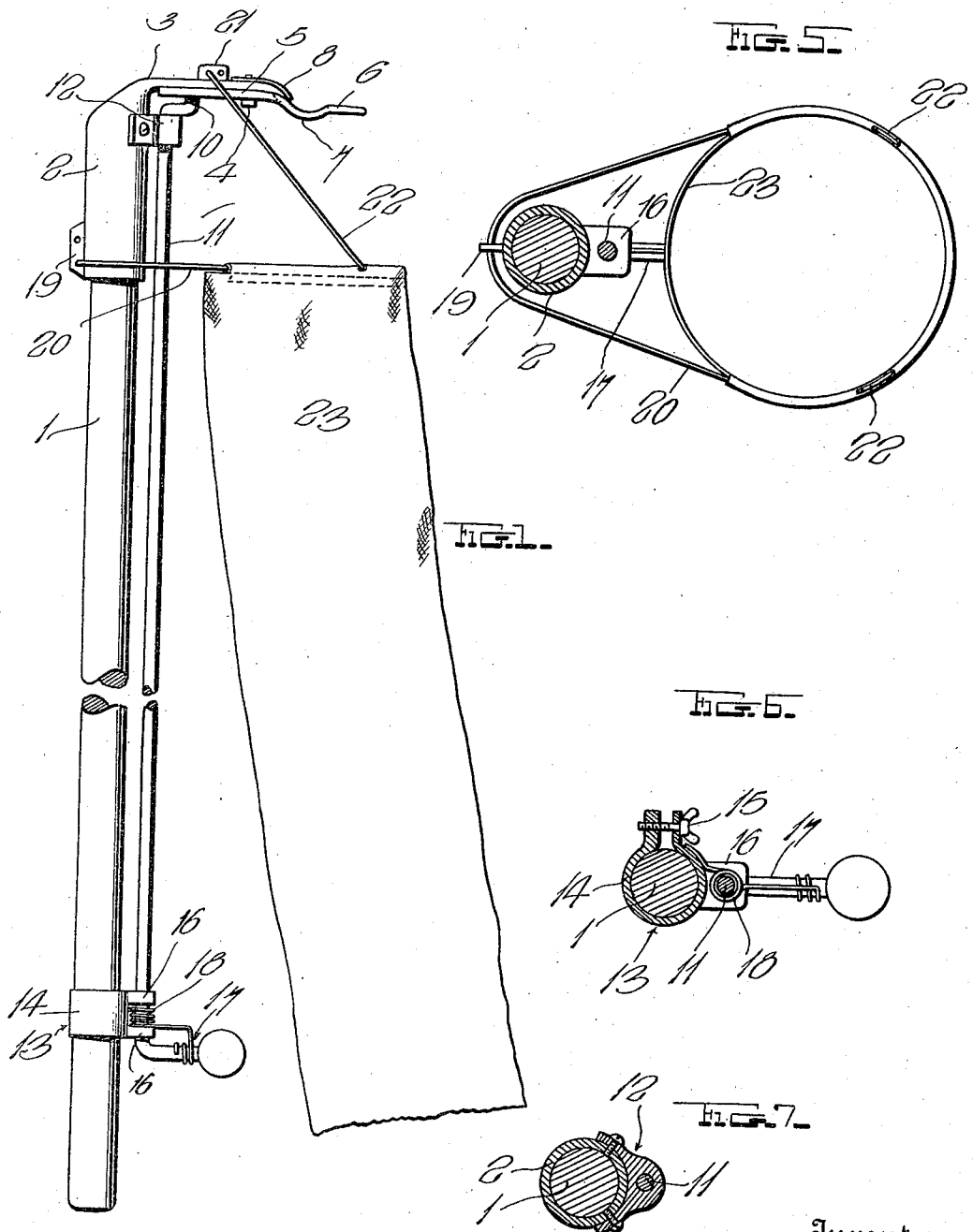

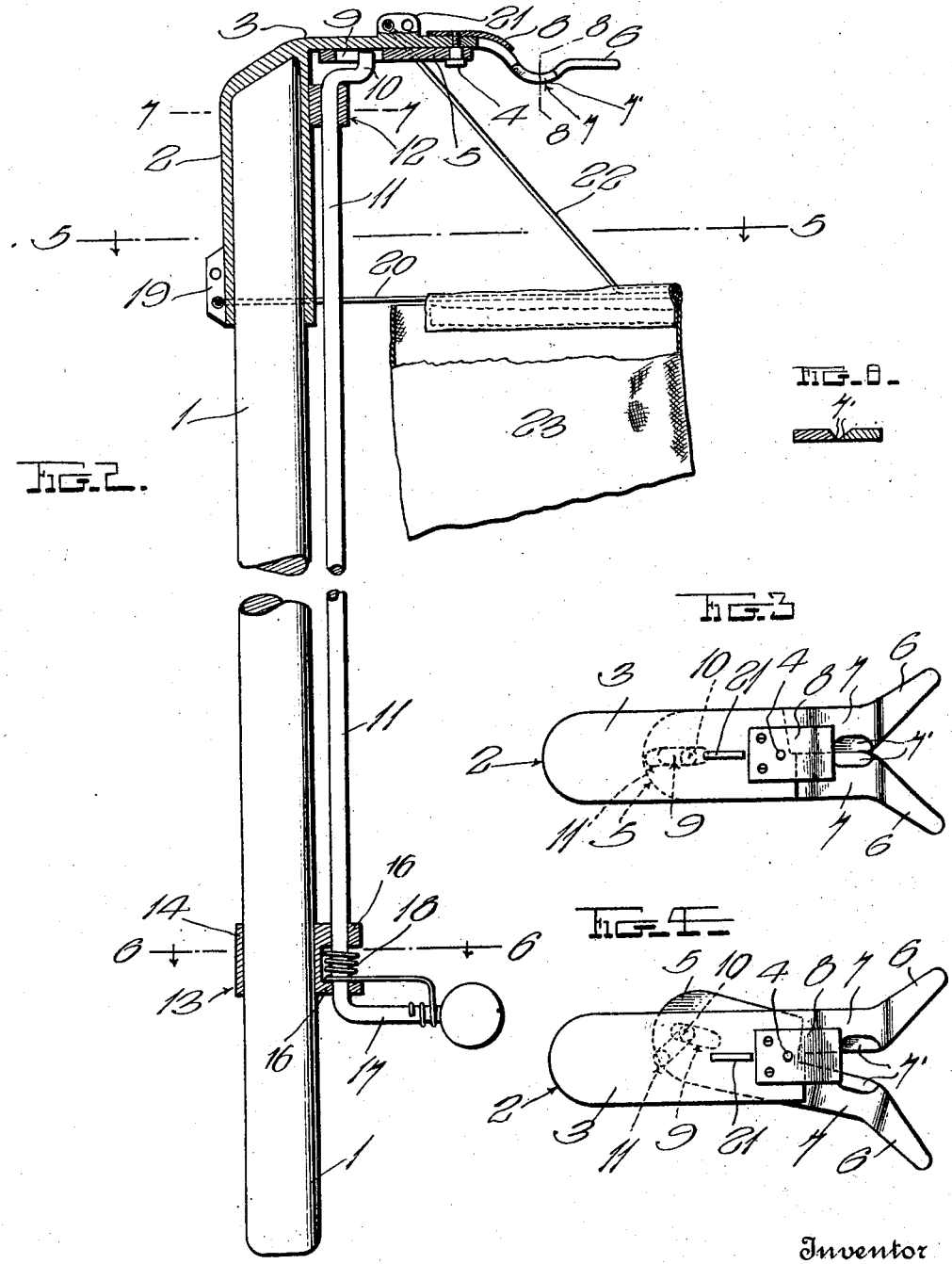

GEORGE R. REYNOLDS, OF LOS ANGELES, CALIFORNIA.

FRUIT-PICKER.

1,235,601.  Specification of Letters Patent.  Patented Aug. 7, 1917.

Application filed May 25, 1916. Serial No. 99,834.

*To all whom it may concern:*

Be it known that I, GEORGE R. REYNOLDS, a citizen of the United States, residing at Los Angeles, in the county of Los Angeles and State of California, have invented certain new and useful Improvements in Fruit-Pickers; and I do declare the following to be a full, clear, and exact description of the invention, such as will enable others skilled in the art to which it appertains to make and use the same.

This invention relates to certain new and useful improvements in fruit pickers, particularly of the class wherein a pair of coacting shear blades are mounted at the end of a comparatively long handle, and wherein a tubular conveyer has its open end supported adjacent said blades.

One object of the invention is to provide a device of this character having an improved form of coacting blades mounted at the upper end of the handle.

A further object of the invention is to provide an improved manner for supporting the open end of the tubular conveyer adjacent the blades.

A still further object of the invention is to provide a pair of blades so constructed that the stems of the fruit which the device is designed to cut will be cut off comparatively short, said blades being provided with a guard for properly positioning the stems for engagement with the cutting edges of the blades.

An additional object of the invention is to provide a device of this character which will be simple, strong, durable and inexpensive in construction, efficient and reliable in operation, and well adapted to the purpose for which it is designed.

With these and other objects in view, the invention resides in certain novel features of construction, and the combination and arrangement of parts as will be hereinafter fully described and claimed.

In the accompanying drawings forming a part of the specification, and in which similar reference characters designate like parts throughout the several views, Figure 1 is a side elevation of a device constructed in accordance with this invention;

Fig. 2 is a vertical longitudinal sectional view of the same;

Fig. 3 is a top plan view of the device, showing the blades in their relative closed positions;

Fig. 4 is a similar view showing the blades in their open positions;

Figs. 5, 6 and 7 are transverse sectional views taken on the lines 5—5, 6—6 and 7—7 respectively of Fig. 2; and Fig. 8 is a detail sectional view taken on the line 8—8 of Fig. 2.

Referring more particularly to the drawings, the reference numeral 1 designates a handle, made preferably of a cylindrical wooden pole of a length sufficient to reach growing fruit, such as apples, oranges, and the like, from the ground. Secured at the upper end of the handle 1 is a cylindrical head or cap member 2, from the upper end of which extends laterally an integral stationary blade 3. Pivoted to the lower side of the blade 3 by a suitable pivot screw 4 is a movable blade 5, said blade 5 coacting with the blade 3, and forming substantially a shear-like cutter for cutting the stems of the fruit. The outer ends of the blades 3 and 5 are struck or flared outwardly at an angle of about thirty degrees to form a pair of diverging fingers 6, the purpose of which will be hereinafter described. The blades 3 and 5 are provided with intermediate substantially semi-circular downwardly offset portions 7, and extending a short distance into these offset portions 7 is one end of a guard 8, the latter being secured to the stationary blade 3 by the aforesaid screw 4. The upper sides of the blades 3 and 5 are beveled toward their inner edges as at 7′ to arrange the cutting edges thereof at the lower side of the same to cut the stems of the fruit close to the fruit.

The inner end of the blade 5 is provided with a longitudinally extending slot 9 which receives the laterally offset end 10 of a rod 11 which is rockably mounted in suitable guides 12 and 13 arranged at opposite ends of the handle 1. The guide 12 is here shown formed as an apertured lug screwed to the cap member 2 and extending laterally therefrom. The guide 13 may be of any desired construction, but preferably consists of a split band 14 having a set screw 15 for clamping the spaced ends thereof together, and having a pair of spaced apertured lugs 16 extending laterally from one of its sides. The lower end of the rod 11 is bent outwardly at right angles and provided at its free end with a thumb piece to form in effect a lever 17 for operating said rod 11. Surrounding the rod 11 between the spaced lugs 16 is a coiled spring 18, one end of which bears against the guide 13 as shown in Fig. 6, while the other end is secured to the lever 17, whereby the pivoted blade 5 is normally held in its outermost or open position through the medium of the rod 11 and the lever 17, as will be readily understood.

Extending outwardly from one of the sides of the cap member 2 is a lug 19 to which is secured the ends of a suitable wire hoop or ring 20, and extending upwardly from the stationary blade 3 is a similar lug 21, to which is likewise secured a second hoop or ring 22. This hoop or ring 22 is disposed angularly and is secured at its lower side to the outer side of the hoop or ring 20, the latter extending preferably in substantially a horizontal plane. These hoops 20 and 22 support a flexible tubular conveyer 23 which may be of any convenient material, such as a fabric netting and the like. As shown, the open end of this conveyer 20 is disposed directly beneath the cutting edges of the blades 3 and 4, so that the fruit cut by the blades will drop into the conveyer and be conveyed to the operator without being bruised or otherwise injured.

In using this device, the operator grasps the lower end of the handle 1 and raises it into substantially upright position in order to reach the fruit suspended from the trees. As the device is moved into engagement with the fruit, the stems of the latter are received between the converging fingers, thereby guiding them between the cutting edges of the blades. The intermediate offset portions 7 of the blades, which are adjacent the cutting edges thereof, are of a size to fit into the stem cavities of the fruit in order to cut the stems of the fruit off very close, as will be readily understood. The stems are prevented from passing rearwardly beyond the portions 7 by the guard 8, as hereinbefore described. The fruit when cut will drop into the conveyer 23 and be conveyed to the operator, after which it can be removed and packed in baskets, or other receptacles for shipping, without being bruised or injured.

From the foregoing description, taken in connection with the accompanying drawings, the operation and advantages of the invention will be understood without a more extended explanation.

As various changes in form, proportion, and minor details of construction may be resorted to without departing from the spirit of the invention, I do not wish to be limited to the construction herein shown and described other than that set forth in the appended claims.

I claim:—

1. A device of the class described comprising a handle, a pair of coacting blades mounted upon one end of said handle and projecting laterally from the same, said blades being provided with substantially semi-circular downwardly offset intermediate portions adapted to fit into the stem cavities of the fruit to be cut, the inner edges of the offset portions of said blades being beveled on their upper sides to provide cutting edges, and means for operating said blades.

2. A device of the class described comprising a handle, a pair of coacting blades mounted upon one end of said handle and projecting laterally from the same, said blades being provided with substantially semi-circular downwardly offset intermediate portions adapted to fit into the stem cavities of the fruit to be cut, the outer ends of said blades extending in diverging relation to provide stem guiding fingers, the inner edges of the offset portions of said blades being beveled on their upper sides to provide cutting edges, a guard plate mounted upon one of said blades and having one of its ends curved downwardly into the offset portions of said blades and disposed adjacent the inner ends of the cutting edges thereof to prevent the stems of the fruit from passing beyond the cutting edges, and means for operating said blades.

In testimony whereof I have hereunto set my hand in presence of two subscribing witnesses.

GEORGE R. REYNOLDS.

Witnesses:
P. C. TURMAN,
MORRIS KLEIN.

Copies of this patent may be obtained for five cents each, by addressing the "Commissioner of Patents, Washington, D. C."